(12) United States Patent
Fakos et al.

(10) Patent No.: US 8,682,491 B2
(45) Date of Patent: Mar. 25, 2014

(54) SYSTEMS AND METHODS FOR ENERGY MANAGEMENT AND DEVICE AUTOMATION SYSTEM

(75) Inventors: Jim Fakos, Preston (AU); Vince Kennedy, Melbourne (AU); Lazaros Grekos, Preston (AU)

(73) Assignee: Varetika International LLLP, Wilmington, DE (US)

( * ) Notice: Subject to any disclaimer, the term of this patent is extended or adjusted under 35 U.S.C. 154(b) by 492 days.

(21) Appl. No.: 13/021,110

(22) Filed: Feb. 4, 2011

(65) Prior Publication Data
US 2012/0203386 A1 Aug. 9, 2012

(51) Int. Cl.
*G06F 19/00* (2011.01)

(52) U.S. Cl.
USPC ............................. 700/276; 700/291; 709/223

(58) Field of Classification Search
USPC ............ 700/291, 286, 83, 278; 709/223, 227; 713/302; 455/423
See application file for complete search history.

(56) References Cited

U.S. PATENT DOCUMENTS

| | | | | |
|---|---|---|---|---|
| 5,761,083 A * | 6/1998 | Brown et al. | .................. | 700/296 |
| 6,528,957 B1 * | 3/2003 | Luchaco | ........................ | 315/307 |
| 6,577,962 B1 | 6/2003 | Afshari | | |
| 6,631,309 B2 * | 10/2003 | Boies et al. | .................... | 700/291 |
| 7,253,732 B2 * | 8/2007 | Osann, Jr. | ..................... | 340/541 |
| 2002/0069276 A1 * | 6/2002 | Hino et al. | .................... | 709/223 |
| 2003/0101009 A1 | 5/2003 | Seem | | |
| 2006/0038672 A1 * | 2/2006 | Schoettle | ....................... | 340/522 |
| 2006/0095164 A1 * | 5/2006 | Donnelly et al. | ............. | 700/295 |
| 2007/0239317 A1 | 10/2007 | Bogolea et al. | | |
| 2008/0082183 A1 | 4/2008 | Judge | | |

FOREIGN PATENT DOCUMENTS

WO 2011029137 3/2011

\* cited by examiner

*Primary Examiner* — Kidest Bahta
(74) *Attorney, Agent, or Firm* — AKC Patents LLC; Aliki K. Collins

(57) ABSTRACT

An integrated energy management and device automation system for managing a premises electrical system having a plurality of electrical circuits. The energy management and device automation system comprises a central controller. The central controller is configured to receive, over the premises electrical system, energy usage data from a plurality of modules and module originated notifications that a module has been connected to the premises electrical system. The central controller is configured to receive and send, over the premises electrical system, messages for device automation and control from a plurality of modules. The energy management system additionally comprises a plurality of modules. Each module comprises a processor, a powerline interface operatively connected to the processor and to one of the plurality of electrical circuits and a sensor operatively connected to the electrical circuit so that the sensor can sense at least one of current and voltage. Each module is configured to collect data relating to energy usage using the sensor and to transmit the data to the central controller. The central controller uses energy usage data to indentify, profile and analysis connected devices and their usage.

23 Claims, 5 Drawing Sheets

SYSTEMS AND METHODS FOR ENERGY MANAGEMENT AND DEVICE AUTOMATION SYSTEM

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for managing energy consumption and automation of devices, and more particularly to systems and methods for managing energy consumption and automation of devices via a premises area network.

BACKGROUND OF THE INVENTION

Energy consumption has increased, costs are on the rise and utilities are struggling to keep up with demand. Environmentally climate change is a global problem. Energy consumption has increased, costs are on the rise and utilities are struggling to keep up with demand. Peak and average energy usage in domestic and industrial environments is growing exponentially and absence of detailed energy consumption metrics is making systematic management and reduction of energy usage very difficult. Environmentally, climate change is a global problem.

There is an increase in the deployment of next generation networks through the implementation of technologies such as IP/MPLS and FTTH to support delivery of advanced Internet Protocol applications such as high speed Internet access, VoIP, video and multimedia IPTV into the home. More and more consumers, service providers and utilities are looking at adopting and utilizing smart technologies in the premises to allow delivery of advances services, enhance lifestyles through device automation and management, and to ensure reliable, cost-effective management of consumption of energy to minimize environmental impact and reduce energy costs

BRIEF DESCRIPTION OF THE DRAWINGS

The foregoing and other objects, features, and advantages of the invention will be apparent from the following more particular description of various embodiments as illustrated in the accompanying drawings. The drawings are not necessarily to scale, emphasis instead being placed upon illustrating principles of the invention.

DETAILED DESCRIPTION

Figure 1:
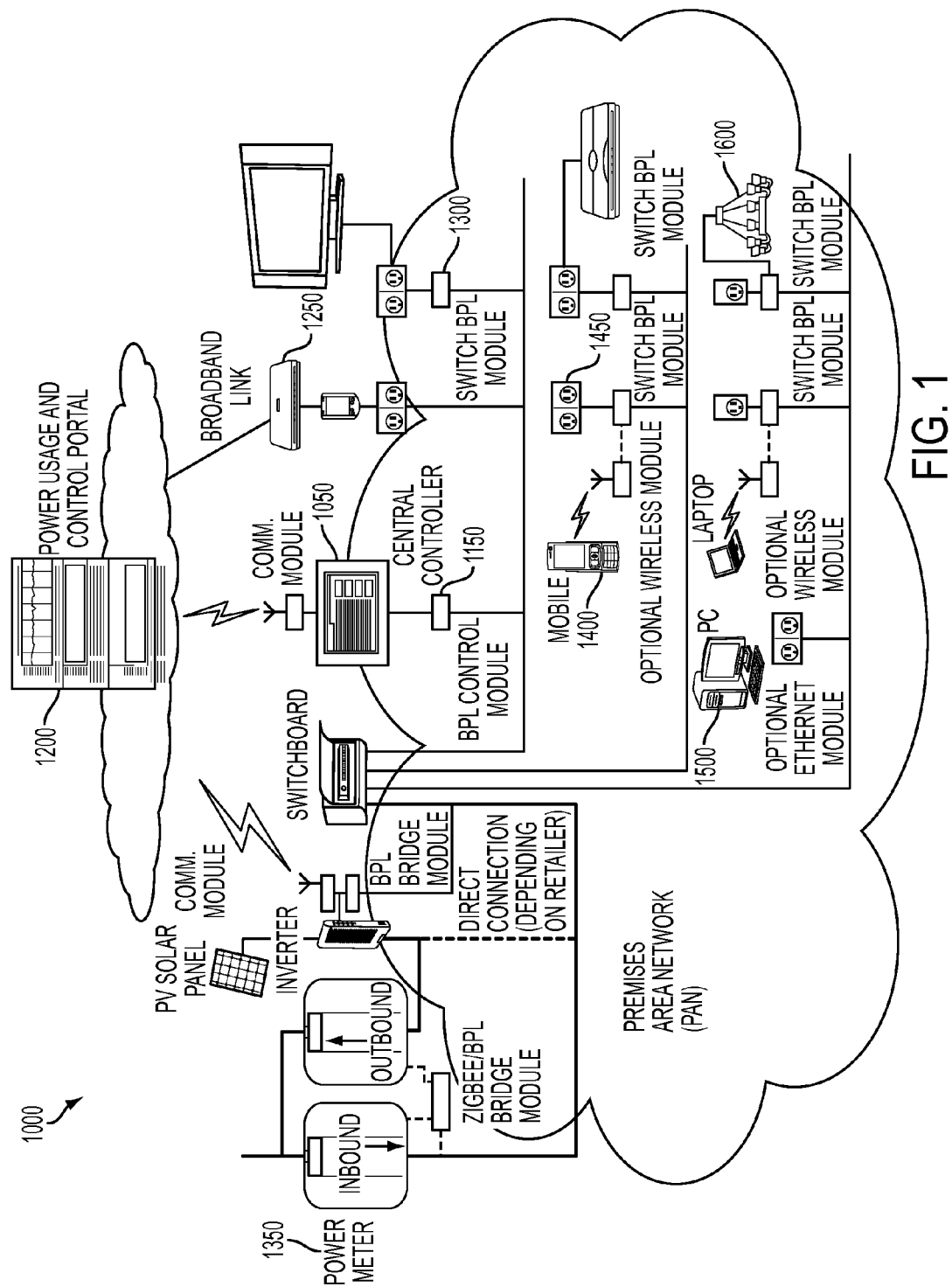
FIG. 1 illustrates a premises area network for supporting various embodiments of the disclosed systems and methods.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

In various embodiments, the present invention is directed to systems and methods that provide networked automated energy management and device automation solutions for new and old buildings. In various embodiments, the disclosed systems and methods utilize in-building broadband networking utilizing electrical wiring, automation for local and remote management of devices and measurement of individual device energy consumption. The system can provide premises networking, device automation, distribution of IP (Internet protocol) services, energy monitoring, energy management and a roadmap for utility demand response and load control. In an embodiment, the systems and methods disclosed herein use broadband over powerline (BPL) technology, where power and data signals co-exist on the power lines, to form a premises area network (PAN) throughout a building using electrical wiring which enables the system to reach all appliances within a power distribution system. In other embodiments other networking technologies now known or developed at a future point in time may be used to form the PAN, and are within the spirit and the scope of the present disclosure.

In an embodiment, the system utilizes an adaptive intelligent and context-aware application that interacts with devices to allow consumers to monitor and manage their use. The application can comprise three functions: automation for device/appliance and lighting control, energy consumption and generation monitoring and energy analysis including tracking and predicative usage mapping, and energy consumption management.

In various embodiments, the systems and methods disclosed herein are based on seamless integration of existing wired and wireless communication technologies combined with smart context-aware software that offers a plug and play solution for automation of energy measurement and device control. In an embodiment, the system can communicate over existing power lines thereby allowing a retro-fit model for existing devices/appliances at minimal cost to consumers. Communication over power lines can offer the ability to use existing cabling infrastructure for communication to devices and is the key to deploying a low cost retro-fit solution.

In an embodiment, the system provides integration of dumb and smart appliances and devices, smart power points and general purpose outlets, lighting switches and systems into a single management domain to increase control and reduce energy consumption.

In an embodiment, the system can allow comparative analysis of real-time and statistical consumption data in hierarchical manner with the ability to drill down into detailed analysis of power consumption, CO2 emissions and cost.

In an embodiment, the system can generate intelligent projection of consumption information while advising potential methods (e.g. reducing standby consumption, tuning heating/cooling temperature, etc.) of reducing energy consumption and amounts of savings that can be made.

In an embodiment, the user interface is accessible from any web enabled device such as touch screen, PDA, PC, etc. and can also communicate using email, SMS and instant messaging, offering more flexibility to users.

In various embodiments, the systems and methods disclosed herein provide smart power management including: integrated energy management applications; intelligent monitoring and tracking of energy usage within the building; individual circuit or device classification, identification and metering; optional utilities supplied smart metering integration; optional data collection from local generation (e.g. solar energy systems); and optional smart meter bypass to allow independence from existing meters & utilities.

In various embodiments, the systems and methods disclosed herein cab provide: smart power aggregation including integrated usage aggregation applications for intelligent monitoring and management; data aggregation of energy usage down to device level; consumption processing, analysis and formation of expected usage and trends; management and customer portals; and communications solutions including Internet or dedicated networks and optional demand management and automatic power reduction.

In an embodiment, the system can allow the identification of devices through profiling their energy consumption characteristics. The identification of the device can include the type of the device (e.g. television, refrigerator, microwave) and the manufacturer and model of the device.

In an embodiment the systems allow the tracking of device energy consumption characteristics for analysis of efficiency and benchmarking and trending of device against expected usage, usage targets and device consumption benchmarks (e.g. against manufactures figures or comparable devices of similar type).

In an embodiment the system can utilize the individual device energy consumption analysis to determine and provide maintenance and/or replacement recommendations of devices.

In an embodiment of the system, the context aware technology identifies cases of wasted energy, such as devices in standby states for a period, and will determine energy reduction schemes which can be implemented with manual intervention by the user or automatically by the system.

In an embodiment of the system, the context aware technology uses profiles to determine appliance and device usage to determine behavioral patterns of consumers.

In an embodiment of the system the context aware technology identifies cases of unexpected events and behaviors, such as, for example, an iron being left on during the day, or a kettle not being used in the morning, to determine abnormal events and to perform actions including issuing as warnings, alerts and notifications.

In an embodiment, the systems and methods disclosed herein provide a central controller that manages the system and provides local and browser portal displays for consumers to access the energy information and control devices. The system can include: (1) seamless integration of various technologies; (2) context-aware persuasive technology; and (3) low cost, simplicity and portability of the system.

In an embodiment, the context-aware persuasive technology for behavioral change that is a part of this development is based on a three-step approach. First, it collects and understands energy usage patterns and utilizes the information to make context based determinations such as identifying problem areas/appliances and times of increased/excessive consumption. Second, it communicates the information using easy to understand and assimilate user interface which may include visual cues such as red zones on house plans/graphs, projection of excessive consumption translated to cost or user notification by sending alerts using email, SMS or instant messaging. Finally, it encourages users to act on the information in real-time in secure and convenient manner from local or remote locations.

In one embodiment, the data within the PAN is encrypted to allow secure connection to the system components including the central controller platform that hosts applications, central controller interface modules that provide management and interfaces to the PAN, metering and control modules that monitor and control devices and appliances, and network gateway modules to interface to other networks and systems, network interface modules to allow other uses for the network such as Internet and IPTV distribution.

In one embodiment, the system provides interfaces to solar inverters and smart meters to give details on generation and usage data.

In one embodiment, the system provides interfaces to dumb and smart meters to obtain data and present information.

In one embodiment, the system provides interfaces to other utility meters such as water and gas meters to allow context aware processing of data and collation of other information to determine usage patterns and consumption of other resources by devices. (e.g. through the automation control application the times the heating system is in operation can be determined—through correlation with the gas meter readings, the amount of energy consumed and cost can be determined)

FIG. 1 illustrates a premises area network (PAN) 1000 for supporting various embodiments of the disclosed systems and methods. The system comprises a central controller platform 1050. In an embodiment, the central controller platform 1050 can include a touch-screen device that combines the functionality of an advanced energy management display with a premises automation system.

The central controller platform 1050 can provide an energy management application with a display that lets consumers track how much energy is being used, what is using the energy, and how much it costs. The application can provide the capabilities to: measure energy usage inside the premises, determine individual device energy usage through either direct measurement or profiling, determine device energy consumption efficiency performance compared to targets and benchmarks, calculate the exact costs and carbon emissions of energy usage and sets energy usage levels with built-in alarm/notification. Additionally, the energy management application can provide premises automation application that provides an advanced device and appliance automation with intuitive display that allows control of metering and control modules for device management.

In an embodiment the central controller platform 1050 provides system management functions including for example system and element monitoring, system and element maintenance, and system and element upgrade capabilities.

In an embodiment, the premises area network 1000 provides connection between the smart power components using BPL. The premises area network 1000 is controlled by a central controller 1050 that connects to the network via a BPL central control module. In an embodiment the central control module provides system interfaces to and between standard BPL and energy efficient BPL technologies to allow co-existance and common connection.

In an embodiment the premises area network 1000 connects to the local power grid power meters and inverters 1350 through a network interface gateway (e.g. a ZIGBEE wireless network to BPL) to allow information and data to be gathered and processed by the central controller platform 1050. In an embodiment the premises area network 1000 connects directly to local power and grid power meters and inverters through BPL interfaces.

In an embodiment the premises area network 1000 connects to other utilities and meters 1351 through a network interface gateway (e.g. ZIGBEE wireless network to BPL) to allow information and data to be gathered and processed by the central controller platform 1050.

In an embodiment, the central controller platform 1050 can communicate with the metering and control modules 1300 through the PAN. In an embodiment, metering and control modules 1300 are used to measure and control energy consumption of devices and appliances. The central control platform 1050 communicates with the metering and control modules through the PAN to obtain data and issue commands. In an embodiment, metering and control modules 1300 are used to provide device and appliance automation functions.

In an embodiment, the PAN can provide interfaces to external networks though network gateway modules 1250 that can include DSL, Cable, 3G and Next Generation networks such as FTTH and LTE.

In an embodiment, the PAN 1000 can additionally provide broadband and quality of service capability for the distribution of advanced Internet Protocol applications such as high speed Internet access, VoIP, IP video and multimedia IPTV.

In various embodiments, the network can additionally provide Ethernet 1500, wireless capabilities 1400 and 1450.

In an embodiment, the system can give consumers the opportunity to access their usage information in detail, and with this knowledge control and manage their consumption through automation. Consumers can choose to share information with utilities to enable better understanding of usage patterns for energy management and give utilities companies access to nominated appliances for demand side management. In an embodiment, the system additionally comprises a data processing and control application 1200 located on the central computer platform. The data processing and control application interfaces with premises systems through secure network connections. The data processing and control application performs an aggregation function to collect, process and store usage data, and provide functions such as energy management, utility analytics, and device management for demand response.

In an embodiment metering and control modules and network gateway modules are located in power outlets and switches to monitor energy consumption and control devices. In an embodiment, one or more metering and control modules and network gateway modules are located between the power distribution wiring and general Purpose power outlets and switches. In an embodiment, one or more metering and control modules and network gateway modules are located between general purpose power outlets and devices.

Figure 2:
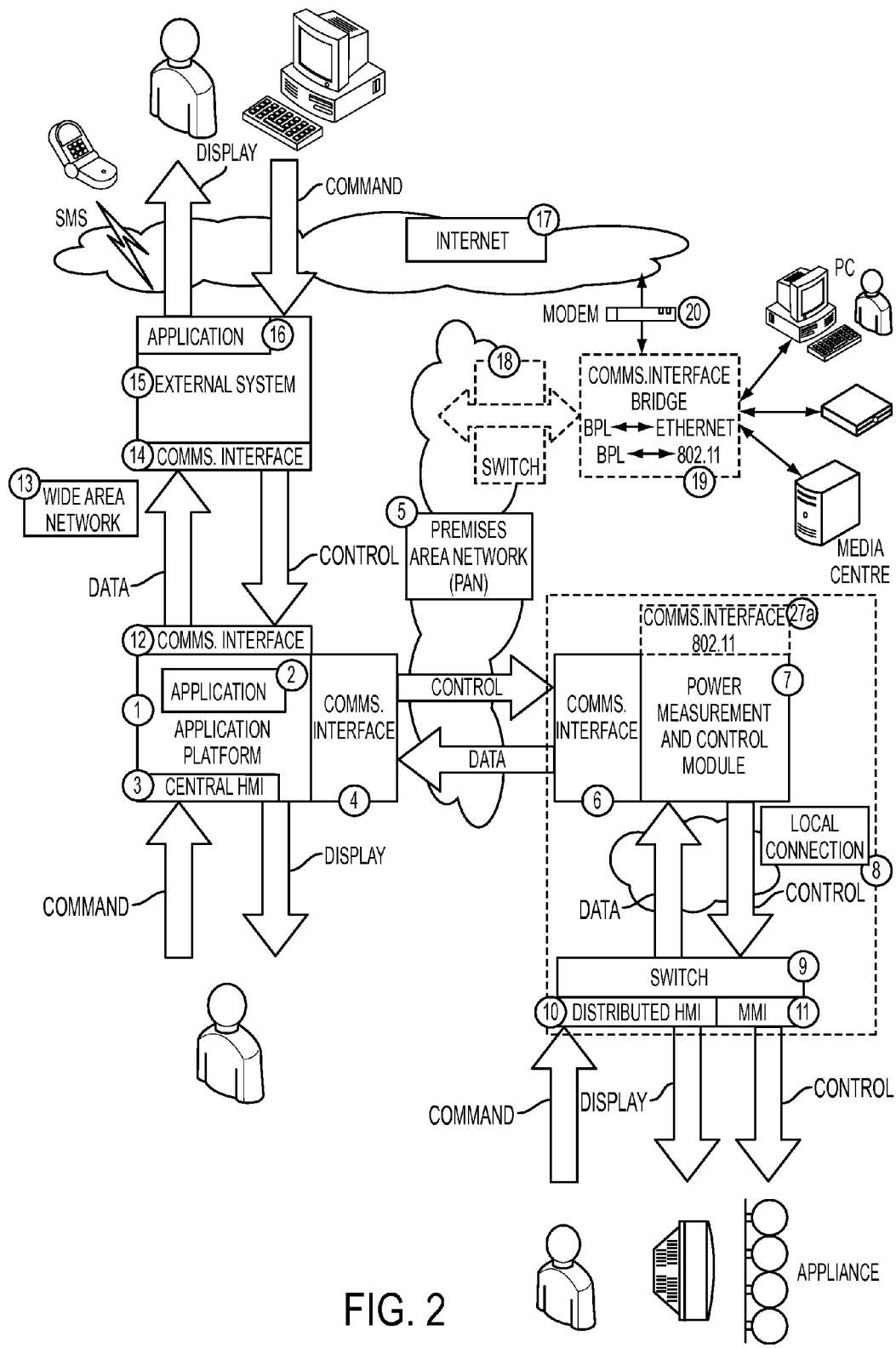
FIG. 2 illustrates an embodiment of an energy and device automation management system.
Figure 3:
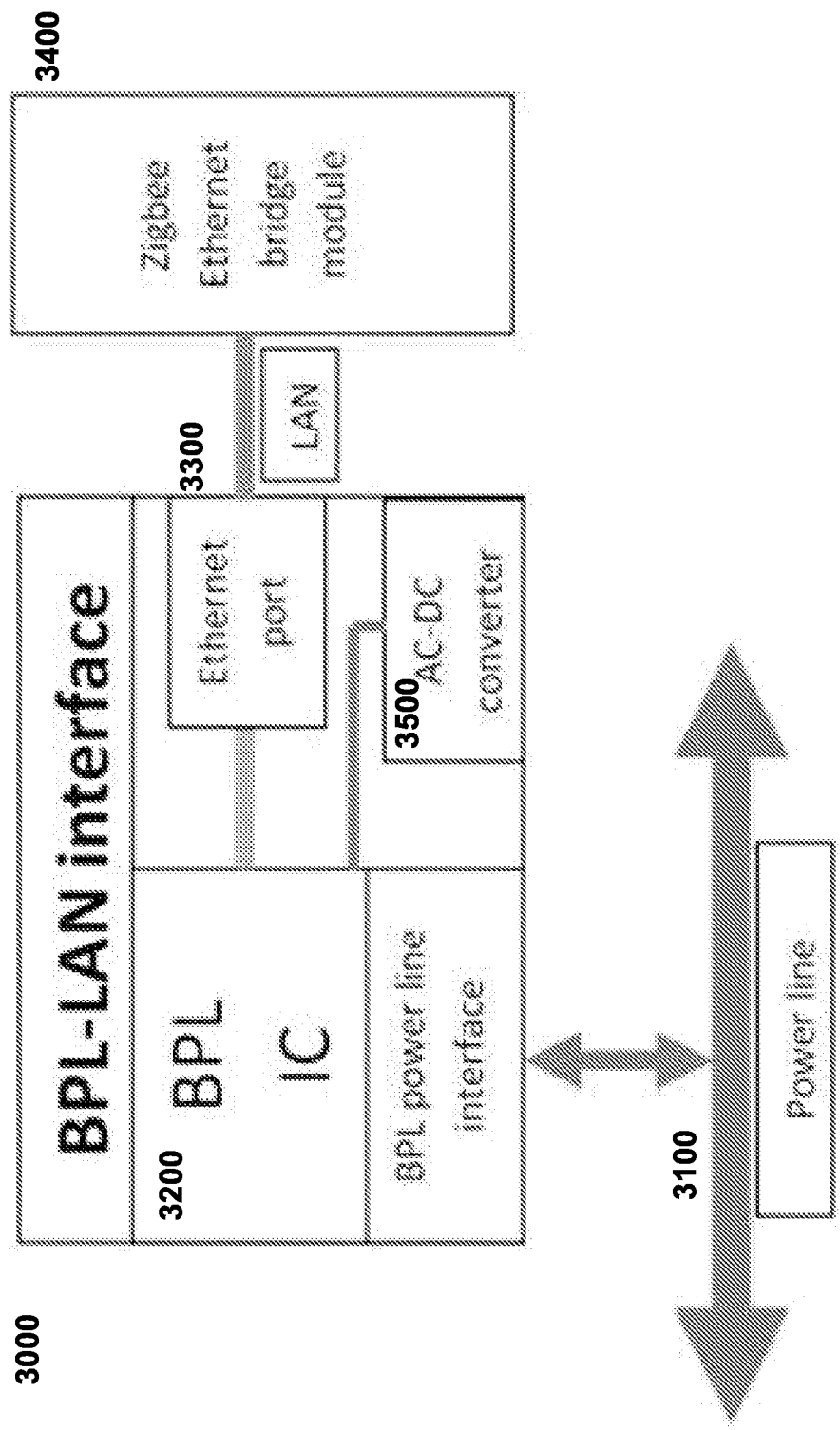
FIG. 3 illustrates an embodiment of a central control interface module.

FIG. 2 is a diagram illustrating one embodiment of the components of an energy management system 2000.

In an embodiment, the system, provides an application platform 1 that can be implemented on a reliable fan-less, diskless microprocessor based controller with solid state memory with an embedded operating system based on either the WINDOWS operating system or the LINUX operating system. In an embodiment, the application platform 1 hosts and executes the applications, stores data and information locally, provides an external user interface (HMI) 10 and provides communication interfaces within the system (local controllers, smart devices, meters) 11 and with external networks.

In an embodiment, the system provides an energy management application 2 that combines energy management and automation capabilities to provide an integrated smart premise solution. In an embodiment, the energy management application gathers and processes information from system components such as smart power control/metering modules, smart meters, and inverters units connected to energy generating devices. In an embodiment, the energy management application uses standard device profiles with known energy usage patterns to allow adaptive identification of device type, through direct metering or circuit based metering.

In an embodiment, at a high level, the energy management application provides:
 actual energy usage profiles associated with devices, circuits and the premises;
 determined energy usage profiles for individual devices, circuits and the premises;
 identify device type, model and manufacturer;
 adaptively updated energy profiles based upon the recorded energy usage; and
 information representing the adaptive energy profiles actual recorded energy usage to allow management of energy consumption.

In an embodiment, the premises device profiles and associated information associated with energy consumption can support predication and identification of potential energy-saving strategies. The application can also provide has option automatically managing energy consumption The application 2 can additionally provide PAN network setup, configuration and/or autoconfiguration, local (controller area) PAN network customization and device/appliance auto detection, optional automatic device profile based detection screens, a security management module (certificate based for external connection, PIN and dynamic key pair based for internal network) and remote update capability using configurable push/pull architecture.

In an embodiment, the smart power application 2 can include abnormal event detection and notification (to include core algorithms and rule system with a limited set of "events detection" support in the first instance In an embodiment, the pull architecture can allow "pulling" signed updates and configurations (e.g. changed pricing, emission rates etc.) to the core system software. In an embodiment, the push architecture support can allow real-time pushing of system components (from the portal to consumer premises) including new automation/control algorithms for energy/load management.

In an embodiment, the smart power application 2 allows the consumer to monitor and control their energy usage and provide different measurement categories for example:

Power: watts/now—watts/peak—watts/min.
Voltage: volts/now—volts/peak—volts/min.
Current: amps/now—amps/peak—amps/min.
Energy: kWh/actual—kWh/hour—kWh/quarter—kWh/year.
Cost: cost/actual—cost/hour—cost/quarter—cost/year.
Greenhouse Gas: gas/actually produced—gas produced./hour—gas produced./quarter—gas produced/year.

In an embodiment, the energy management application 2 provides a local human machine interface (HMI) 3 through a local touch screen monitor connected to the application Platform. The HMI 3 can include a graphical display and appropriate control inputs enabling a consumer to review information representative of energy consumption associated with the premises, and to direct operation and management of devices and appliances installed at the premises. In an embodiment, the system can include: manually customized data presentation and device control frontend application modules and a GUI configuration designer for offering template support to system integrators or re-seller In an embodiment, the central controller has communication interfaces 4, 6 and 6a. The communications interface provides an ethernet to broadband over powerline (BPL) bridge and allows network connectivity over existing electrical wiring in a building. The communications interface uses a suitable broadband over powerline networking protocol such as the Homeplug, IEEE P1901 or similar power line communications standard.

In an embodiment the system provides a ZIGBEE wireless network-BPL interface. which extends automation and communication capability to ZIGBEE enabled appliances and to other smart meters and water and gas meters with ZIGBEE interfaces.

Referring back to FIG. 2, in an embodiment, a suitable communications network protocol is used to form a premises area network 5 used by the system BPL enables a fast, wired network within the Premises using the existing electrical wiring which means that no new wires or cables are necessary, making installation quick and easy and less expensive than other networks. The premises area network (PAN) 5 can be used by other applications such as broadband Internet, data and file sharing, HD programs, video-on-demand (VOD), multi-room HD DVR recordings, voice over IP (VoIP), and streaming of HD video, music, and photos.

In an embodiment, the system provides control modules 7 for local switches to allow consumers to remotely control lighting and appliances. The control module can provide a in-built power meter capability to allow monitoring of individual devices. The monitoring of energy consumption can be continuous and reported to the energy management application 2. The control module can additionally provide switch control capabilities to allow automation of individual 'non-smart' devices. The switch control function can be activated locally through a manual switch or remotely through the energy management 2 and automation applications.

Figure 4:
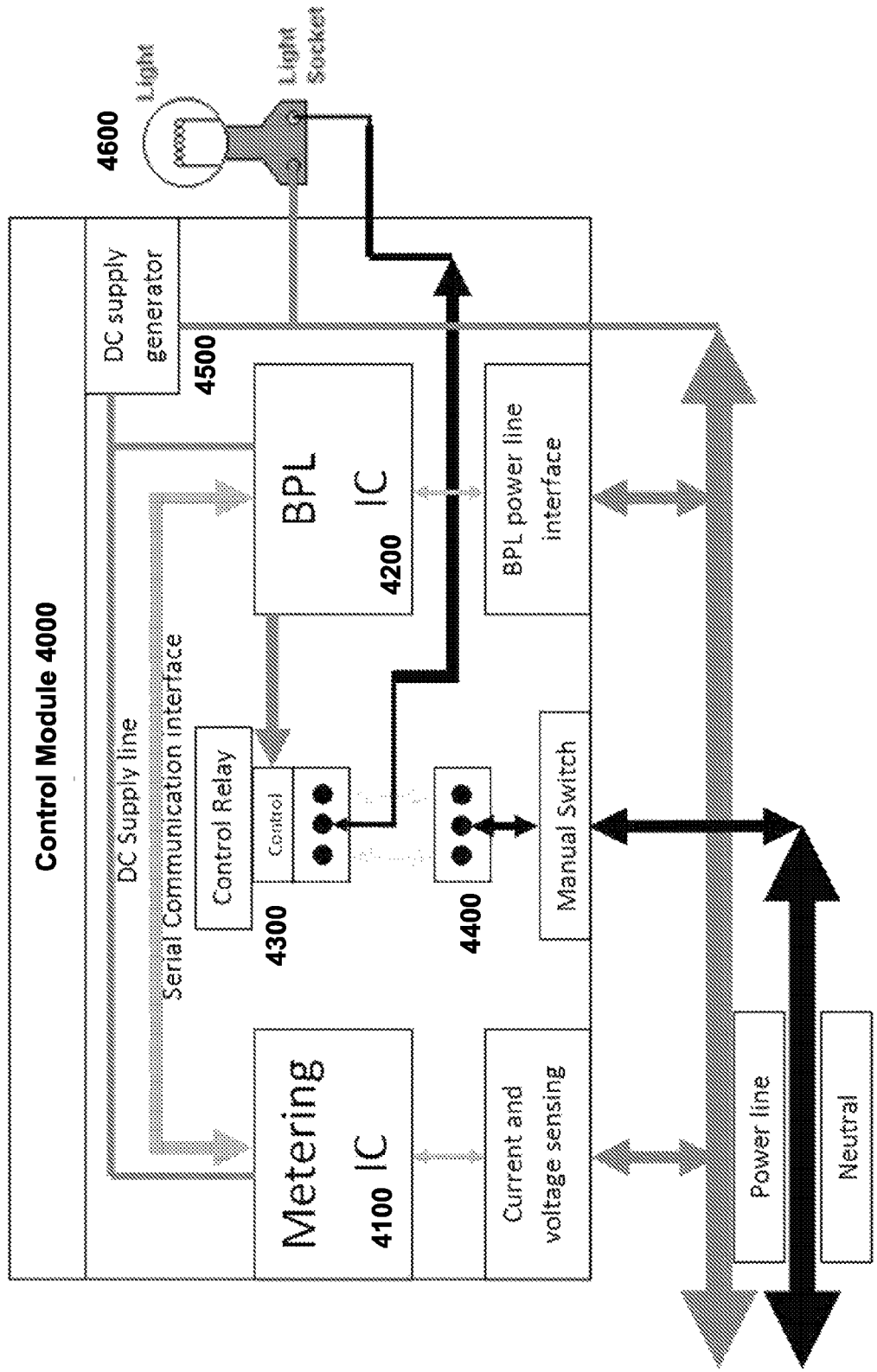
FIG. 4 illustrates an embodiment of a metering and control module.

FIG. 4 illustrates one embodiment of a control module 4000 for controlling appliances or other electrical devices 4600. Control modules are plug and play and go through an auto discovery process once installed by notifying the either the energy management or automation applications the device has joined the network. Where the smart power applications are not present or if communication is lost, the control module can work in a standalone mode and be controlled using the local switch input.

The control module 4000 is an integrated solution comprising of: power measurement using metering integrated circuit (IC) 4100 using resistive or inductive current and voltage sensors. A manual switch 4400 is provided connected with 2-way control logic to allow manual control in case of faults with control or communication system. The control module 4000 connects to the premises area network via a BPL powerline interface 4200. The module additionally has a AC-DC converter 4500 for DC supply voltage required by the metering/BPL components.

In an embodiment, embedded control software 4300 can include customizable interval recording of real time current, voltage, power and power factor values with the capability to interrogate the module in real-time and/or full smart metering solution (may include an additional embedded microcontroller/flash memory) for collection/storage of additional metering data.

Referring back to FIG. 2, in an embodiment, the system can include a BPL to Wi-Fi interface module 7a that allows connection of standard wi-ft enabled devices to the PAN. The interface can be used to extend Wi-FI coverage throughout the home, eliminating black spots. In an embodiment, the local connection 8 is a wire connection to the local switch. Typically, this will be AC power, relay and switch controls.

In an embodiment, the control module can be used in-wall with standard switch receptacles or as standalone switch units. In the case of in-wall applications, the control module 7 can be wired in line with standard electrical switches 9 independent of supplier and form factors. This type is suitable for lighting and appliance applications. In the case of standalone switch units 9, the control module 7 can be located within a power adaptor that is installed between a general purpose outlet and the appliance to be installed.

In an embodiment, the local HMI 3 is a mechanical switch that provides local user control input to the control module and overrides smart power remote settings. In an embodiment, the system provides a local machine to machine interface using, for example, a general purpose outlet or physical wiring connection that supply power to devices. This can include an inline relay/solid state switch within the control module that allows control of the power circuit.

In an embodiment, the system provides an upstream communications interface 12 for remote system access by consumers and external systems including smart grid applications. The type of access and access privileges can be totally configurable by the consumer. The smart power applications can provide web browser and API (application programming interface) interfaces for remote access and connection to external applications.

The web browser connection can be secured using certificates and with username/password authentication. When connected, the user experience can be similar to the interface provided by the local HMI. The API interconnection can be established by smart power application by initiating a SSL-secured outbound TCP/IP connection to an external destination. The connection can allow two-way communications for energy management and device control. In an embodiment, the upstream communication interface default configuration is a disabled state.

In an embodiment, the system can use a wide area network 13, such as the Internet, to connect customer to the central controller 1. In an embodiment, the system provides a communications interface 14 that provides a secure point-to-point encrypted tunnel between customer premises and external systems. The tunnel can be used to gather information from the customers system and to send control signals to in home devices. The secure communications uplink can additionally be provided with an option to use in-home WiFi if available In an embodiment, the system includes a centralized external system 15. The External system is a centralized computer system which stores and processes data, and initiates alarms and alerts to customers when required. The external system can be located on high availability hardware located in a secure data center.

In an embodiment, the system provides an application interface 16 that is a secure user portal for customer access from remote locations. The customer can view their usage data and control their in home appliances through this interface. The system utilizes Internet access 17 to provide customer access to the user portal through the internet via a secure login and authentication process. In an embodiment, the system connects to the premises area network through a general purpose switch 18.

In an embodiment, the system provides stand-alone BPL units 19 to convert any power point into a network access point. The Stand-alone units are plugged into power points and extend the Premises network through an Ethernet interface.

Figure 5:
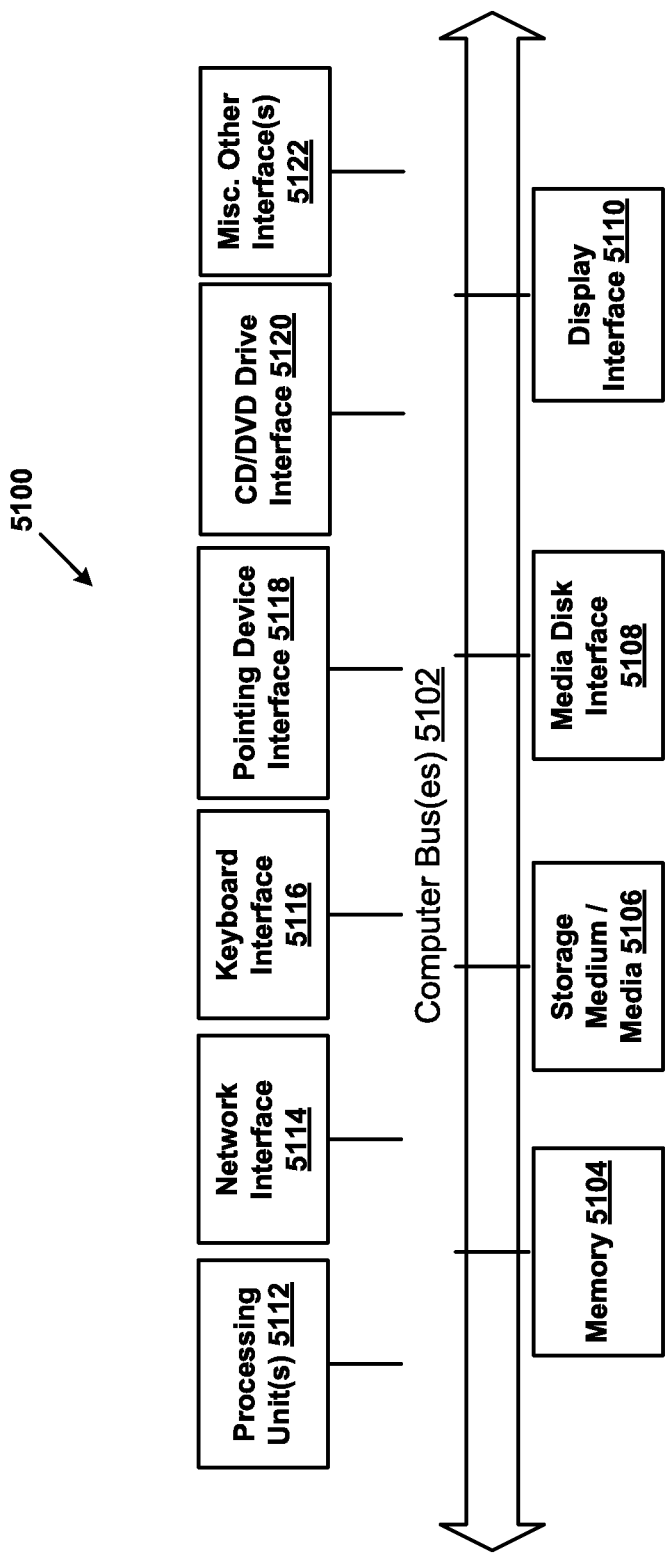
FIG. 5 illustrates an embodiment of a central control platform computing device.

FIG. 5 is a block diagram illustrating an internal architecture of an example of a computing device, such the external system 15 of FIG. 2 or the central controller 1050 of FIG. 1, in accordance with one or more embodiments of the present disclosure. A computing device as referred to herein refers to any device with a processor capable of executing logic or coded instructions, and could be a server, personal computer, set top box, smart phone, pad computer or media device, to name a few such devices. As shown in the example of FIG. 8, internal architecture 5100 includes one or more processing units (also referred to herein as CPUs) 5112, which interface with at least one computer bus 5102. Also interfacing with computer bus 5102 are persistent storage medium/media 5106, network interface 5114, memory 5104, e.g., random access memory (RAM), run-time transient memory, read only memory (ROM), etc., media disk drive interface 5108 as an interface for a drive that can read and/or write to media including removable media such as floppy, CD ROM, DVD, etc. media, display interface 5110 as interface for a monitor or other display device, keyboard interface 5116 as interface for a keyboard, pointing device interface 5118 as an interface for a mouse or other pointing device, and miscellaneous other interfaces not shown individually, such as parallel and serial port interfaces, a universal serial bus (USB) interface, and the like.

Memory 5104 interfaces with computer bus 5102 so as to provide information stored in memory 5104 to CPU 5112 during execution of software programs such as an operating system, application programs, device drivers, and software modules that comprise program code, and/or computer-executable process steps, incorporating functionality described herein, e.g., one or more of process flows described herein. CPU 5112 first loads computer executable process steps from storage, e.g., memory 5104, storage medium/media 5106, removable media drive, and/or other storage device. CPU 5112 can then execute the stored process steps in order to execute the loaded computer-executable process steps. Stored data, e.g., data stored by a storage device, can be accessed by CPU 5112 during the execution of computer-executable process steps.

Persistent storage medium/media 5106 is a computer readable storage medium(s) that can be used to store software and data, e.g., an operating system and one or more application programs. Persistent storage medium/media 5106 can also be used to store device drivers, such as one or more of a digital camera driver, monitor driver, printer driver, scanner driver, or other device drivers, web pages, content files, playlists and other files. Persistent storage medium/media 5106 can further include program modules and data files used to implement one or more embodiments of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. An integrated energy management and device automation system for managing a premises electrical system having a plurality of electrical circuits, the energy management system comprising:

a central controller operatively connected to the premises electrical system, the central controller being configured to receive, over the premises electrical system, energy usage data from a plurality of modules and to store the energy usage data on a storage device accessible to the central controller, and being further configured to receive module originated notifications that a module has been connected to the premises electrical system;

the plurality of modules, each module comprising a processor, a powerline interface operatively connected to the processor and to one of the plurality of electrical circuits and a sensor operatively connected to the one of the plurality of electrical circuits so that the sensor can sense at least one of current and voltage, each module being configured to collect data relating to energy usage using the sensor and to transmit at least a portion of the data relating to energy usage to the central controller as energy usage data, each module also being configured to automatically send a notification of its presence to the central controller when the module is connected to the premises electrical system; and at least one of the plurality of modules being configured to control the operation of a controlled electrical device when the controlled electrical device is connected to the electrical circuit to which the at least one module is operatively connected.

2. The system of claim 1 wherein the central controller is additionally configured to identify an identifiable electrical device based on energy usage data when the identifiable electrical device is connected to one of the plurality of electrical circuits.

3. The system of claim 2 wherein the central controller is additionally configured to use standard device profiles with known energy usage patterns to identify the identifiable electrical device when the identifiable electrical device is connected to the one of the plurality of electrical circuits.

4. The system of claim 1 wherein the central controller is additionally configured to analyze and track energy usage of a trackable electrical device and compare energy usage and efficiency against benchmarks and targets.

5. The system of claim 1 wherein the central controller is additionally configured to set energy usage levels on at least one of the plurality of electrical circuits.

6. The system of claim 5 wherein the central controller is additionally configured to generate an alarm when energy usage on the at least one of the plurality of electrical circuits exceeds its respective energy usage level.

7. The system of claim 1 wherein the central controller is additionally configured to identify a problem electric device attached to one of the plurality of electrical circuits using the energy usage data.

8. The system of claim 1 wherein the data relating to energy usage comprises real time current, voltage, power and power factor values.

9. The system of claim 1 wherein the central controller is additionally configured to provide comparative analysis of real-time and statistical energy usage data.

10. The system of claim 1 wherein the central controller is additionally configured to calculate the costs and carbon emissions of energy usage.

11. The system of claim 1 wherein the central controller is additionally configured to report power consumption, $CO_2$ emissions and cost.

12. The system of claim 1 wherein the central controller is additionally configured to generate projection of consumption information and advise methods of reducing energy consumption and amounts of savings.

13. The system of claim 1 wherein the central controller is additionally configured to provide a remote user interface.

14. The system of claim 1 wherein at least one of the plurality of modules is a switch module, wherein the switch module is located between the power distribution cabling and a power general purpose outlet.

15. The system of claim 1 wherein at least one of the plurality of modules is located in a standard general purpose outlet.

16. The system of claim 1 wherein at least one of the plurality modules is a standalone switch unit, wherein the module is located within a power adaptor that is installed between a general purpose outlet and an electrical device to be installed.

17. The system of claim 1 wherein:
the central controller is additionally configured to transmit control commands to each of the plurality of modules; and
each module is additionally configured to receive control commands from the central controller and to respond to the control commands.

18. The system of claim 17 wherein the control commands are commands to power down a device attached to a module and the module responds by powering down the device.

19. The system of claim 18 the central controller is additionally configured to the automatically transmit the control commands to the module when excessive energy usage relating to the device is detected.

20. The system of claim 1 where the energy usage data is used to determine the type, model and manufacture of devices and appliances.

21. The system of claim 1 where the energy usage data is used to determine behavioral patterns of energy consumption within a premises electrical system.

22. The system of claim 1 where the energy usage data is used to determine operational performance and efficiency for an electrical device.

23. The system of claim 1 where the energy usage data is used to determine maintenance and replacement requirements for an electrical device.

* * * * *